UNITED STATES PATENT OFFICE.

CHARLES H. PHILLIPS, OF NEW YORK, N. Y., ASSIGNEE OF HIMSELF AND LAWRENCE REID, DECEASED.

IMPROVEMENT IN MAKING A HYDRATE OR MILK OF MAGNESIA.

Specification forming part of Letters Patent No. 141,167, dated July 22, 1873; reissue No. 5,808, dated March 24, 1874; application filed March 18, 1874.

*To all whom it may concern:*

Be it known that CHARLES H. PHILLIPS and LAWRENCE REID, of New York, in the county and State of New York, have invented certain new and useful Improvements in the Process of Making Hydrate or Superhydrate of Magnesia, and an aqueous mixture of the same, termed by them "Milk of Magnesia," of which the following is a specification:

The invention relates to a new and improved process of making or preparing a hydrate of magnesia, by means of which a chemical compound suitable for medical and other purposes is obtained in a pure form, and which is termed by them a "superhydrate of magnesia," or, in chemical parlance, a "superhydrate of the oxide of magnesium;" and from which is made, for medical purposes, a preparation named "milk of magnesia," and which simply consists of a mixture of the so-called superhydrate of magnesia with water in proper proportions, and for which Letters Patent of the United States were granted to them on the 29th day of April, 1873, and numbered 138,282. The improved process consists in subjecting any salt of magnesia capable of solution in water to the action of an aqueous solution of a caustic alkali, and then treating the chemical compound thus prepared or created to repeated washings in pure water.

To enable others skilled in the art to employ and use the improved process of making a hydrate of magnesia, or of making the aqueous preparation thereof termed milk of magnesia, a description in detail will now be given, here premising that the greatest care should be exercised, as well in the selection of the raw material from which the preparation is to be made as in the conducting of the process itself; otherwise it will be most difficult to obtain the article in a pure form.

For this purpose any, but preferably a pure, salt of magnesia capable of solution in water may be taken—as, for instance, the sulphate or carbonate of magnesia, or chloride of magnesium; but the first for many reasons is preferred; and so with the alkali, any pure caustic alkali may be taken, but pure caustic soda or potash is preferred.

With this explanation, the process itself will now be described as made from sulphate of magnesia, the other salts of magnesia being operated on in precisely the same way after the magnesia has been all precipitated. Take one hundred and twenty-five pounds of pure sulphate of magnesia, and dissolve it in, say, two hundred gallons, more or less, of distilled water, and when thoroughly dissolved filter it through paper, if either necessary or desirable; then add to it a solution of caustic alkali similarly prepared, in quantity sufficient to free and precipitate the magnesia from the sulphuric acid with which it was previously combined. For this purpose it will require about fifty-seven pounds of real soda, or about eighty-six pounds of real potash, completely dissolved, to produce the desired result. This quantity, when thoroughly washed and prepared, will be sufficient to make one hundred gallons of milk of magnesia. The two solutions above mentioned, on being added the one to the other, are then thoroughly mixed and incorporated with each other by any suitable mechanical appliance; and although chemical decomposition almost instantly ensues, the stirring and mixing are continued for some time thereafter, so as to insure a perfect decomposition and chemical reorganization of the elements of the solutions used. The length of time necessary for such purpose need not be long; but we deem it advisable to continue the agitation from a very few minutes to half an hour, and even a longer time may be beneficial.

The product of this operation is an insoluble hydrate or superhydrate of magnesia diffused through the mother liquid, and which consists of an aqueous solution of the sulphate of the alkali employed.

The chemical process having been completed, the solution and mixture are allowed to settle for about twenty-four hours, or thereabout, and the clear liquor then drawn off, after which more distilled water is added in quantity sufficient to replace the liquor withdrawn, and the whole thoroughly stirred and mixed for any suitable length of time, and again allowed to settle, and the clear liquor afterward drawn off, as before. After the second or third washings are completed, and fresh water added, say, for the fourth washing, the mixture may then, if desired, be subjected to boiling for half an hour or more, in some suitable vessel or boiler, through the aid of steam, either by the diffusion of the steam throughout the mass, from the open end of a steam-pipe, or by steam through the medium of a double or jacketed boiler or vessel; or it may be effected by a coil of pipe arranged in the bottom of the vessel or boiler, through which steam from the boiler is made to pass and discharge either on the inside or outside of the boiler; or this pipe may be perforated with a great number of small holes, through which the steam may be injected into the boiler in small jets, for the purpose of agitation, in which event the coil, if desired, may be closed at its outer end, and made removable by unscrewing the coupling which connects it with the main steam-pipe; or, instead of a coil for that purpose, it may consist of a series of small pipes connected to one main feed-pipe, and the latter with the steam-pipe of the boiler, and from which, like the others, it can be disconnected for removal, if desired; or the boiling may be accomplished in any other suitable manner. But in all cases, while the boiling continues, and even for some little time afterward, sufficient agitation, either through the direct action of steam, or else by some suitable mechanical appliance, must be employed to prevent the coagulation and accumulation on bottom and sides of the vessel of the magnesia. This done, the solution and mixture are allowed to settle for twenty-four hours, or thereabout, as before, and the clear liquor, containing a portion of the soluble sulphate of the alkali employed, then drawn off. More distilled water is then added to the boiler, in quantity sufficient to replace the liquor withdrawn, and steam or heat with agitation applied, as before. The boiling is then allowed to continue as long as in the former case, and the solution again allowed to settle, and which will consume about the same length of time as before, when the clear liquor is to be again drawn off, and the same operations repeated for some seven or eight times, with the addition of fresh distilled water each time, so as to effectually remove from the precipitated magnesia the sulphate of the alkali formed during the process of reducing it from its state of combination as a sulphate to its present condition as a hydrate or superhydrate. The supernatant liquor resulting from the last boiling should not only be tasteless, but should yield no precipitate with the exhibition to it of a solution of nitrate of barytes slightly acidulated with nitric acid; otherwise the operations must be repeated until it comes up to the test requirements; or, instead of using cold water for the first three or four of the operations, the whole process may be conducted from the very commencement of boiling—say, for half an hour each time; but, as before, agitation must be kept up during and even for some time after the boiling process has been completed; but I prefer the former method, as the boiling of the mixture in the first place seems to impart a bitter taste to the product very difficult to remove by subsequent washings. The last or test liquor having been drawn off, the remainder may be again washed, if desired or deemed advisable, with fresh distilled water, and allowed to settle, and that then drawn off also. This done, as much pure distilled water is added as will dilute the mass of magnesia to a thin consistency, and which shall contain about twenty grains of pure magnesia per fluid ounce, or about four times as much real magnesia as there is contained in any of the so-called fluid-magnesia preparations now in use—a point of considerable importance in administering medicine to infants and invalids; but, while that is about the strength it will be generally made and offered for sale, it is not proposed to be confined to such proportions, as it may be made weaker or stronger to any required extent, in order to meet the requirements of the profession and the public, and this simply by diminishing or increasing the quantity of water with which the magnesia is mixed, according as the mixture is required to be made weak or strong; but twenty grains per fluid ounce answers an admirable purpose, and may in that form be administered in suitable quantity to young or old without hesitation or danger.

The sulphate of magnesia has been described as the source from which the magnesia is obtained in this preparation; but any other soluble salt of magnesia will answer the same purpose—such as chloride of magnesium. And in regard to the caustic alkalies used, although they can be obtained tolerably pure, still it is preferred and considered better to specially prepare them for the purpose, and which may be done by any of the usual processes known to chemists, or by any other process by which they can be obtained in a pure form by exercising skill and care in their preparation. For this purpose caustic soda or potash is preferred to any of the other alkalies. And though silver vessels are preferred to be used in making the preparation, yet earthenware or wooden vessels may be advantageously employed.

Having thus described what is considered the best process for preparing a pure hydrate or superhydrate of magnesium by the action of a pure caustic alkali upon the soluble salts of magnesium, a modification of the process may be alluded to, which depends on filtration and washing with pure distilled water for the separation of the alkaline sulphate from the precipitated magnesia, instead of boiling and drawing off the liquor. In this process the magnesia is precipitated from the solution of its salt by the caustic alkali, as before, using for this purpose the same materials and proportions of materials. The whole is then placed on filters, and repeatedly washed with pure distilled water until the washings no longer give evidence of the presence of sulphates upon being tested with nitrate of baryta, as before described. The pulpy mass is then mixed through sieves, and by agitation with a sufficiency of water to bring it to the required strength in order to produce the milk of magnesia. Great difficulties, however, are experienced in this operation because of insufficiency and tediousness of the washing and the presence of coagulated lumps of the hydrate of magnesia, which interferes with the smoothness and fluidity, and consequent efficacy, of the magnesia, for which reasons it is preferred to keep the magnesia in the fine state in which it is originally precipitated by using the open steam process before described; or, instead of using the boiling process, the operation may be conducted without the application of heat in any form, in which case the same materials and proportions of materials will still be used, and the mixture kept in a state of agitation until the chemical action of the caustic alkali upon the soluble salts of magnesia employed has been thoroughly effected, on which the new compound is allowed to settle, and the supernatant liquor drawn off, as before, and the residuum then treated with repeated washings with pure distilled, but cold, water, accompanied by agitation, as in the former way, it differing in no respect from that, save that the heating or boiling process is omitted; but, while a fair product can be obtained in this way, the manipulation first described is preferred, as not only being more expeditious, but for the further reason that the product is finer and smoother, and, in some respects, possibly purer and better.

Having thus described the invention, what is claimed as new is—

The process herein described of preparing a pure hydrate or superhydrate of magnesia, to wit, by subjecting a soluble salt of magnesia to the action of a caustic alkali, and then treating it in the manner substantially as set forth.

In testimony whereof I have hereunto set my hand to this specification.

CHAS. H. PHILLIPS.

Witnesses:
JOHN H. STITT,
C. E. H. PHILLIPS.